United States Patent [19]
Kircher et al.

[11] Patent Number: 5,015,044
[45] Date of Patent: May 14, 1991

[54] BRAKING PRESSURE REGULATING DEVICE

[75] Inventors: Dieter Kircher, Frankfurt am Main; Peter Volz, Darmstadt; Hans Wupper, Friedrichsdorf, all of Fed. Rep. of Germany

[73] Assignee: Alfred Teves GmbH, Frankfurt, Fed. Rep. of Germany

[21] Appl. No.: 359,750

[22] PCT Filed: Jul. 4, 1988

[86] PCT No.: PCT/EP88/00587
§ 371 Date: May 8, 1989
§ 102(e) Date: May 8, 1989

[87] PCT Pub. No.: WO89/01890
PCT Pub. Date: Mar. 9, 1989

[30] Foreign Application Priority Data
Aug. 25, 1987 [DE] Fed. Rep. of Germany ....... 3728307
Feb. 19, 1988 [DE] Fed. Rep. of Germany ....... 3805218

[51] Int. Cl.⁵ ............................................. B60T 8/44
[52] U.S. Cl. .................... 303/114; 303/100; 303/116
[58] Field of Search ............... 303/100, 110, 113, 114, 303/115, 116, 119

[56] References Cited
U.S. PATENT DOCUMENTS
4,768,842 9/1988 Ogino et al. .................... 303/114
4,790,608 12/1988 Burgdorf et al. .................... 303/114

FOREIGN PATENT DOCUMENTS
3542824 6/1987 Fed. Rep. of Germany.
3627000 2/1988 Fed. Rep. of Germany.
3627809 2/1988 Fed. Rep. of Germany.

Primary Examiner—Duane A. Reger
Attorney, Agent, or Firm—Robert P. Seitter

[57] ABSTRACT

A braking pressure regulating device, in particular an anti-lock control device for hydraulic brake systems of automotive vehicles, comprising a master cylinder and a pressure modulator for the variation of the hydraulic pressure in the wheel cylinders during the braking pressure control mode. The device is equipped with a motor-driven pump (8) for generating a hydraulic pressure and with an electronic control unit (5) for controlling the valves of the pressure modulator (2). During the braking pressure control mode, the working chambers (10, 15) of the master cylinder (16) are exposed to pump pressure. Caused by the pump pressure in the working chamber (10), the push rod piston (11) and thus the brake pedal (1) disadvantageously are returned into their basic position in prior-art devices. The present arrangement provides that the switching positions of the regulating valve incorporated in the push rod piston are shifted into the cylinder during the braking pressure control mode. Therefore the brake pedal is not fully reset during the control mode. The operating comfort of the brake pedal is thereby augmented.

14 Claims, 5 Drawing Sheets

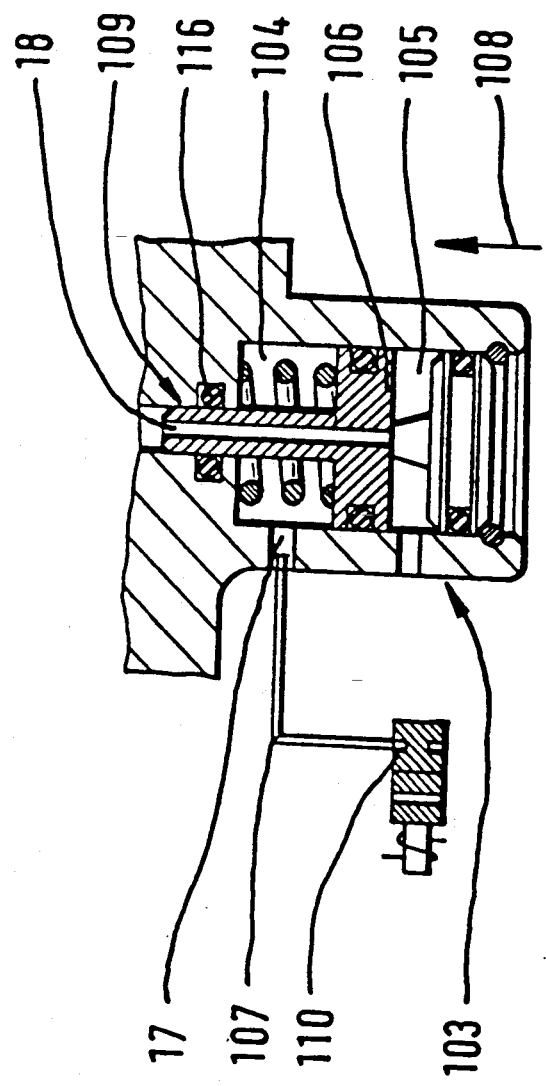

BRAKING PRESSURE REGULATING DEVICE

BACKGROUND OF THE INVENTION

The present invention relates to a braking pressure regulating device, in particular an anti-lock control regulating device, traction slip control device for hydraulic brake systems of automotive vehicles, comprising a master cylinder with at least one working piston, (push rod piston and/or floating piston) and at least one working chamber, a supply reservoir for pressure fluid, a pressure modulator for the variation of the hydraulic pressure in the wheel cylinders of the wheel brakes during the braking pressure control mode, the said pressure modulator including inlet and outlet valves for the wheel cylinders, an electronic control unit for the control of the valves of the modulator, at least one motor-driven pump for generating a hydraulic pressure, the working chamber of the master cylinder being applied by pump pressure in the braking pressure control mode and the working piston of the master cylinder being movable in the direction of its initial position caused by the pump pressure, a regulating valve being provided in at least one working piston which, in the braking pressure control mode, regulates the pressure fluid flow in the hydraulic fluid cycle that is composed of pump, working chamber of the master cylinder, supply reservoir (pressure fluid flow regulation).

Braking pressure regulating devices, in particular in the form of anti-lock systems, are used in the motor vehicle industry in increasingly large numbers. In specific categories of these anti-lock systems, hydraulic pumps are used for generating an auxiliary pressure during the control mode.

A like anti-lock device has become known from e.g. German published patent application DE-OS 36 41 712.2.

This application describes a valve for a brake system with slip control, with a pedal-operated, preferably auxiliary-force assisted braking pressure generator, with a master cylinder to which the wheel brakes are connected via main brake lines, with hydraulic auxiliary-pressure pumps as well as with wheel sensors and electronic circuits for determining the wheel rotational behaviour and for generating electric braking pressure control signals permitting to control electromagnetically actuatable pressure-fluid inlet valves and outlet valves inserted for slip control into the pressure fluid lines, with the pistons of the master cylinder comprising valves which, in the brake's release position, open pressure-fluid connections between the pressure fluid supply reservoir and the pressure chambers and which close these pressure-fluid connections in the braking position.

The special characteristics of this device reside in that valves arranged in the pistons of the master cylinder comprise in each case a valve member longitudinally slidable in a recess and cooperating in each case with an opening member, e.g. a tappet, in such a fashion that the tappet moves the valve member into its opened position when the respective piston is in its release position, with the tappet taking support on a stationary pivot, cross member or bolt, and with each recess being closed on the side facing the pressure chamber by means of a bowl portion which serves as a support of the respective valve-closure spring.

In braking pressure regulating devices of the described known type, the pump pressure causes the brake pedal to return to its initial position during the control mode. This is not desirable in many events. Due to this shift-back, the operating comfort for the driver is impaired.

It is an object of the present invention to devise a braking pressure regulating device wherein the brake pedal is not slid back into its initial position during the control mode.

Further, it should also be possible to achieve several positions of the brake pedal in front of its initial position. Besides, it is principally desired to improve the pedal feeling during the control mode.

These improvements are to be accomplished by means as simple as possible, and the solution of the object is to be cost-efficient.

There should be need for only few and fail-safe component parts.

The need for additional sensors should be obviated. It should not be necessary to alter the brake power booster.

SUMMARY OF THE INVENTION

This object is achieved according to the instant invention in that means are provided which, in the braking pressure control mode, displace the switching positions of the regulating valve incorporated in the working piston (push rod piston and/or floating piston) into the master cylinder.

Regulating valves are known which are incorporated as a central regulating valve in the working piston and which are composed of a valve seat, a valve closure member, a tappet acting upon the valve closure member and opening the regulating valve as well as a stop for the tappet.

In braking pressure regulating devices of the type initially referred to which are equipped with the regulating valve described hereinabove, it is suggested to solve the objects at issue in that, in the braking pressure control mode, the stop for the tappet is arranged to move by predefined distances away from its initial position into the master cylinder so that in the braking pressure control mode the pressure fluid flow control in the hydraulic fluid cycle takes place at positions of the working piston which are displaced into the master cylinder.

In another embodiment of this invention, there is provision of hydraulic, electromagnetic, pneumatic or mechanic actuating means which position the stop for the tappet in the direction into the master cylinder at a distance in front of its initial position.

When employing a hydraulic actuating means, in particular a hydraulic piston-cylinder assembly, the pump pressure can be made use of for pressurization.

It is proposed in a preferred embodiment that the stop for the tappet consists of a stop device which comprises a movable direct stop member and a movable indirect stop member.

The movable indirect stop member can be arranged in a manner able to be positioned by the pump pressure, on the one hand, and by the force of a spring element, on the other hand.

In further realising this idea, a separate pressure chamber can be provided in the master cylinder which is confined by the movable indirect stop member and is variable in its volume. This movable indirect stop member can be designed as a piston which is displaceable by the pump pressure in opposition to the force of a spring.

In braking pressure regulating devices which, as an integral component part, comprise a brake power booster, in particular a so-called 'vacuum brake power booster', it can be provided in an embodiment that the mentioned separate pressure chamber in the master cylinder is formed of the master cylinder housing, the described displaceable piston and the force-transmitting element of the brake power booster.

In a group of further embodiments of this invention, a mechanical blocking unit is provided which, in the braking pressure control mode, positions the stop for the tappet in specific positions in front of the initial position.

This blocking unit is maintained stationary by a fixing mechanism in one or more positions in front of the initial position and is composed of a sleeve accommodated in the master cylinder and having a stop element for the tappet of the regulating valve, the said stop element being preferably composed of a component part (cross member) which is placed crossly to the axis of the master cylinder and is designed in particular like a pin, and which is located within the sleeve.

The fixing mechanism can be arranged in the master cylinder housing, in particular in a way displaceable radially in opposition to the sleeve, and can fix said sleeve in one or more positions either by operative engagement, e.g. by jamming, or by positive engagement, e.g. by means of a profile.

For fixing by way of positive engagement, the sleeve can be furnished with a saw-tooth-shaped external profile.

In a special embodiment, the fixing mechanism is composed of a piston which is guided in the master cylinder wall and is slidable by a hydraulic piston-cylinder assembly. This piston-cylinder assembly can be acted upon by the pressure fluid of the pump in the braking pressure control mode.

In another embodiment, the fixing mechanism designed as a piston is displaced by an electromagnetic lifting mechanism, in particular by a magnet. This lifting mechanism can be controlled by the electronic control unit of the braking pressure regulating device.

The fixing mechanism designed as a piston can be shifted by a pneumatic converter against the sleeve in another embodiment. This pneumatic converter uses the difference between the atmospheric pressure, on the one hand, and the pressure below atmospheric pressure in the suction pipe of the internal combustion engine of the automotive vehicle or a vacuum pump, on the other hand, and that is to say, for generating a translatory force which acts upon the piston. The pneumatic converter can be controlled by the electronic control unit of the braking pressure regulating device.

The above-described arrangement of blocking unit and fixing mechanism, more particularly according to the embodiments of FIGS. 3, 4, 5 can be arranged for the push rod piston or for the floating piston of a tandem master cylinder or for both pistons.

The instant invention affords the following advantages:

The mentioned shortcomings of the state of the art are eliminated and the manifold requirements of the inventive objects are achieved. It is accomplished by very simple means and at low costs that one or more switching positions of the regulating valve are reached which are placed in a manner shifted into the master cylinder.

BRIEF DESCRIPTION OF THE DRAWINGS

Further details of the invention can be gathered from the following description of several embodiments of this invention. These embodiments are explained by way of five Figures.

FIGS. 4 and 5 show further embodiments.

DETAILED DESCRIPTION

Figure 1:
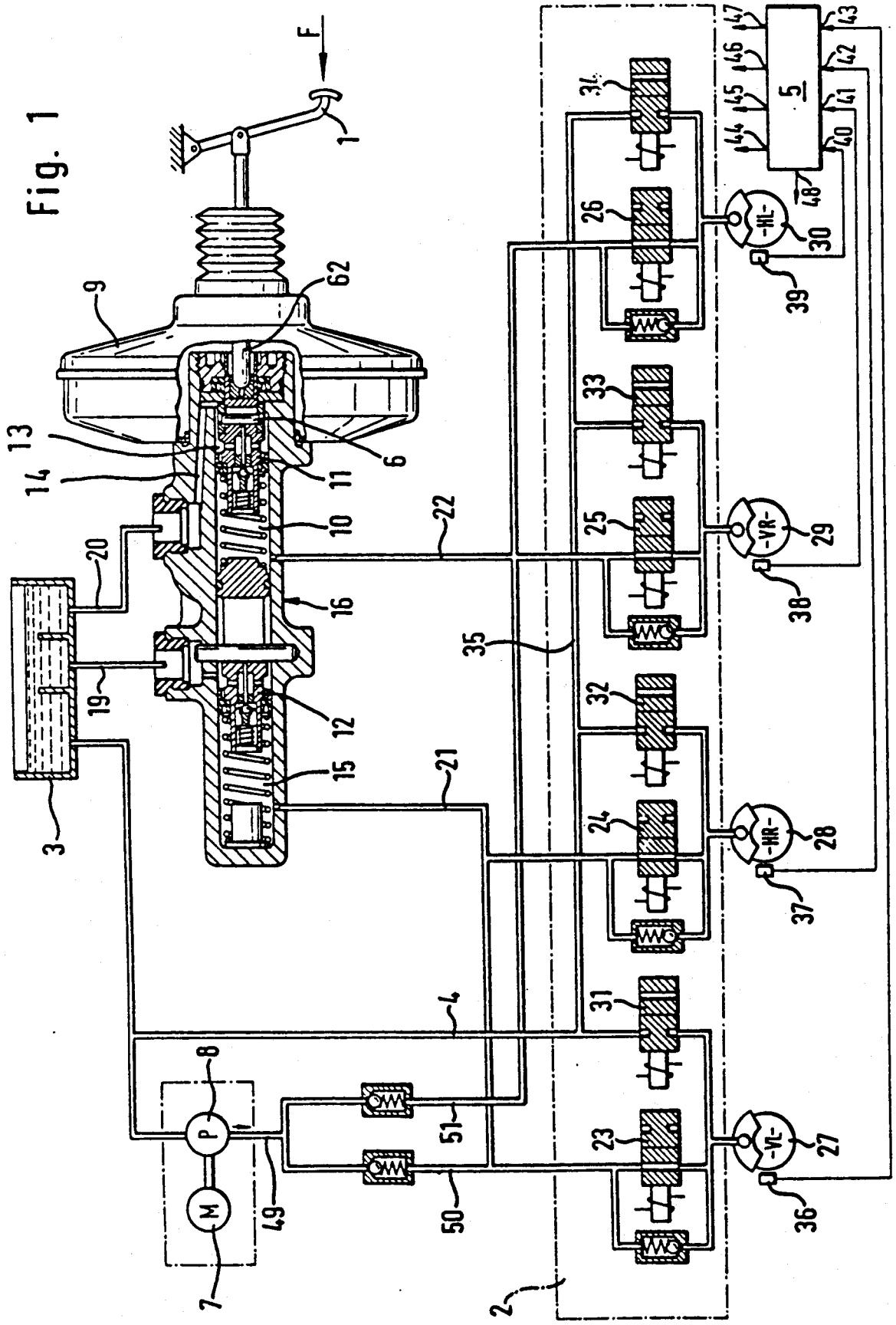
FIG. 1 shows an anti-lock control device with a vacuum brake power booster.

The device according to FIG. 1 is to be considered as state of the art, it comprises the following aggregates: a vacuum brake power booster 9 operated by the brake pedal 1, a tandem master cylinder 16, a modulator 2 for the pressure control in the anti-lock mode, an electronic control unit 5 for processing sensor signals and a hydraulic pressure pump 8 which is driven by an electric motor 7.

FIG. 1 displays the apparatus in the release position. The pressure chambers 10, 15 of the master cylinder communicate in a known fashion with the pressure-fluid supply reservoir 3 via open central regulating valves, via connecting channels in the interior of the pistons as well as via an annular chamber in the intermediate piston, via bores and via hydraulic lines 19, 20.

The two pressure circuits 21, 22 of the master cylinder communicate with the wheel brakes 27, 28, 29, 30 via electromagnetically actuatable valves which are open in their initial position, that is to say so-termed SO-valves (SO=opened in their de-energized state) or inlet valves 23, 24, 25, 26.

The parallel connected wheel brakes 27, 28 and 29, 30, respectively, are allocated to the diagonally arranged pressure circuits (brake circuits) 21, 22. For the arrangement of the vehicle wheels corresponding to the mentioned brakes, the following short terms have been used: VL for front left, HR for rear right, VR for front right, HL for rear left wheel. The wheel brakes 27, 28, 29, 30 are connectible further via electromagnetically actuatable outlet valves 31, 32, 33, 34, so-termed SG-valves (SG =closed in their de-energized state) which shut off in their inactive position, via a hydraulic return line 35 and via the line 4 with the supply reservoir or pressure-compensating reservoir 3. The vehicle wheels are equipped with electrical sensors 36, 37, 38, 39 which cooperate with toothed discs co-rotating synchronously to the wheel rotation and which generate electric signals indicative of the wheel rotational behaviour, that means the wheel speed and variations of this speed. These signals are fed via the inputs 40, 41, 42, 43 to the electronic control unit 5. This electronic control unit processes the sensor signals on the basis of a control algorithm memorized in it to form output signals (braking pressure control signals) which, in the braking pressure control mode, serve to operate the SO-valves and SG-valves, in consequence whereof the braking pressures are decreased, are kept constant or re-increased in the individual wheel cylinders of the disc brakes corresponding to the control algorithm. To this end, the actuating magnets of the SO-valves and SG-valves are driven via the outputs 44, 45, 46, 47 of the electronic control unit. The electrical connecting lines between the ports 44, 45, 46, 47 and the coils of the So-valves and SG-valves are not illustrated in the Figures. In the braking pressure control mode, the electric motor 7 of the pump 8 is put into operation. The switch-on signal is applied on the motor by the output 48 of the electronic control unit 5. In the control mode, the pump develops pressure in the pressure lines 49, 50, 51. These lines represent a pressure fluid conduit which is connected with the pressure fluid conduit of the tandem master cylinder, i.e. the pressure lines 21, 22. That is to say, in the control mode, the pressure chambers 10, 15 of the tandem master cylinder are pressurized by the pump.

Upon brake application in the normal braking mode, the pedal force F is transmitted onto the master cylinder pistons boosted by the vacuum in the booster 9. The central regulating valves in these pistons will close, thus allowing braking pressure to develop now in the pressure chambers 10, 15 and hence in the brake circuits 21, 22 which propagates via the SO-valves 23, 24, 25, 26 to the wheel brake cylinders. On detection of an imminent locked condition at one or more of the wheels by means of the sensors 36, 37, 38, 39 and the electronic control unit 5, the anti-lock control mode will commence. The drive motor 7 of the pump 8 will be switched on, whereby pressure develops in the pressure lines 49, 50, 51 which, on the one hand, is applied on the wheel cylinders of the wheel brakes via the SO-valves and, on the other hand, pressurizes the pressure chambers of the master cylinder, as is illustrated. In consideration of the control algorithm, further signals of the electronic control unit will cause change-over of the electromagnetically actuatable SO-valves and SG-valves.

The pump pressure in the working chambers 10 and 15 cause the working pistons 11 and 12 in FIG. 1 to displace to the right. The push rod piston 11 moves until its right-hand stop 6 (FIG. 1) in the prior-art brake power boosters. As a result, the brake pedal 1 is reset, it assumes its initial position. That is to say, the driver's foot pushes against a reset pedal.

In this position, the central valves of the push rod piston 11 and of the intermediate piston 12 will open. Pressure fluid can flow back via these central valves into the supply reservoir 3 in a manner known per se via the return lines 19 and 20.

As regards the intermediate piston, this is effected via the unpressurized annular chamber of the intermediate piston. As regards the push rod piston, this is effected via the unpressurized supply chamber 13, the supply bore 14 into the return line 20. During the entire control mode, the working pistons are retained in their initial position. Likewise the brake pedal is retained in its initial position during the entire control mode.

Figure 2:
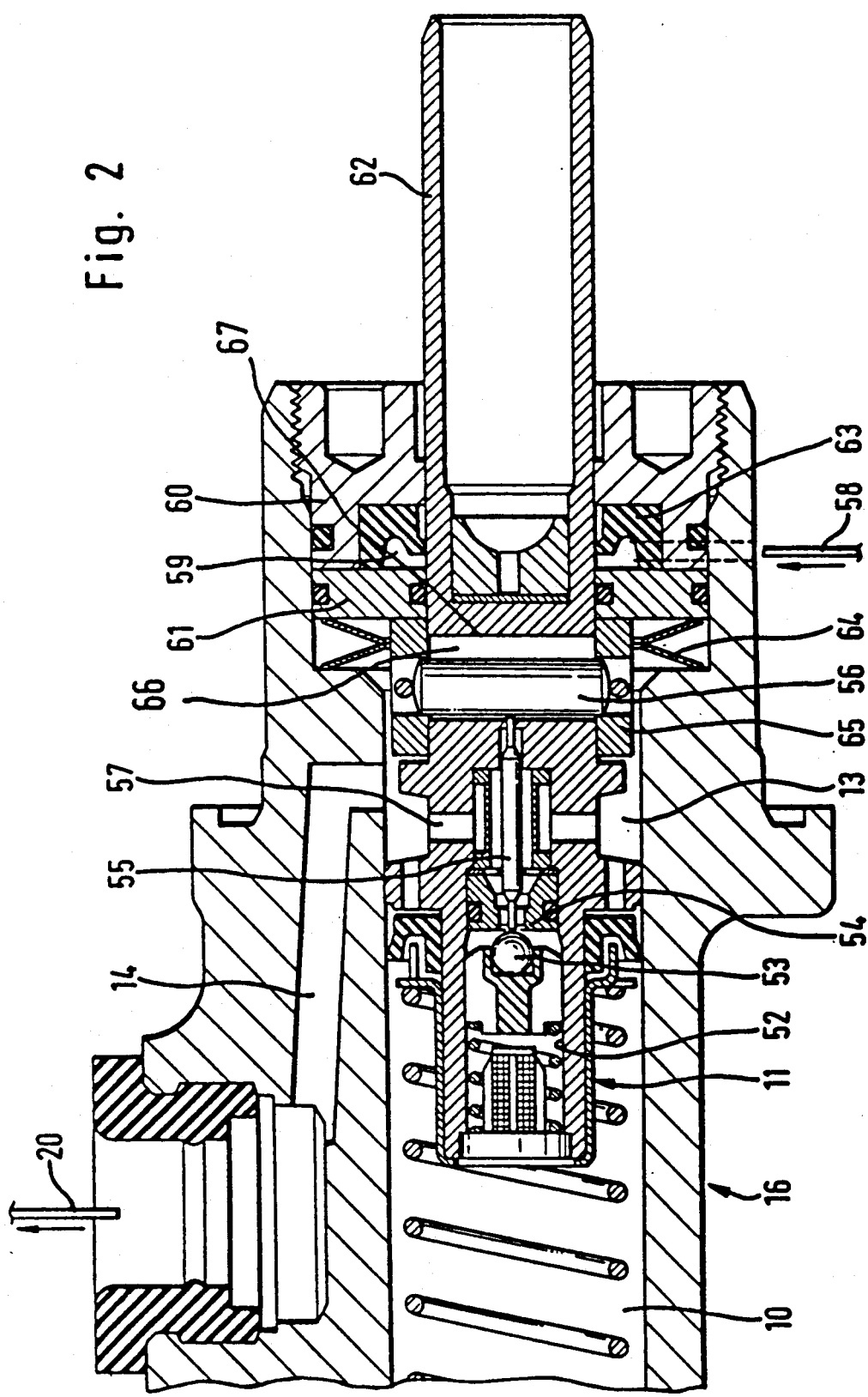
FIG. 2 shows an embodiment of this invention.

FIG. 2 illustrates the master cylinder in the area of the push rod piston in more detail.

As a whole, the push rod piston is referred to by 11. Reference numeral 10 designates the working chamber which is pressurized by the push rod piston. 13 designates the unpressurized supply chamber which is in communication with the supply reservoir via the lines 14 and 20.

The push rod piston 11 comprises an inside bore 52. Accommodated in this bore is the central valve composed of spherical closure member 53 and valve seat 54.

When, due to the pump pressure in the working chamber 10, the push rod piston in FIG. 2 is displaced to the right, the tappet 55 will move into abutment on the cross pin 56.

The tappet lifts the spherical closure member 53 from the valve seat 54 so that pressure fluid can propagate out of the pressure chamber 10 through the central valve and the radial bores 57 into the chamber 13 and from there via the lines 14 and 20 into the supply reservoir.

In the prior art, this took place in the right-hand end position of the push rod piston. Hence, the brake pedal was returned completely to its initial position in the prior art. In the embodiment of this invention according to FIG. 2, it is arranged for that pump pressure is introduced into the pressure chamber 59 via a pressure line 58.

This line 58 can be an external line or a line which is composed of bores n the master cylinder housing.

The pressure chamber is formed of the master cylinder bottom 60, the master cylinder housing 16, the piston 61 and the push rod 62 of the vacuum brake power booster 9. The seal 63 is provided for sealing the pressure chamber.

In the normal braking mode, the push rod piston 11 is displaced to the left into the master cylinder.

Upon commencement of the braking pressure control mode, chamber 59 will be exposed to pump pressure. This pump pressure causes the piston 61 to displace to the left in FIG. 2.

Spring 64 is compressed as a result. Via the sleeve-shaped spacer 65, the stop pin for the tappet 55, or cross pin 56, is moved to the left during the control mode.

As can be gathered from FIG. 2, the cross pin or stop pin 56 is arranged crossly in a recess 66 in the push rod piston.

In the braking pressure control mode, i.e. upon pressurization of chamber 59, the cross pin 56 will move away from the rear wall 67 of the recess 66 in the push rod piston in the direction of the right-hand end of the tappet 55.

Finally, the cross pin 56 abuts as a stop on the tappet 55.

That is to say, in the control mod, opening of the central valve is achieved by the tappet 55 in front of the right-hand initial position of the working piston.

Compared to its initial position, the position of the push rod piston in the master cylinder is shifted into the master cylinder.

Now the control function known per se of valve 53, 54 will commence, and namely in the braking pressure control mode, e.g. in the anti-lock control mode, in a position of the push rod piston which is shifted into the master cylinder when compared to the initial position of the push rod piston.

Consequently, the brake pedal which is coupled with the push rod piston in terms of effect by way of the vacuum brake power booster and the pedal assembly, will not be moved back into its extreme initial position in the control mode. Upon actuation, the brake pedal will remain in positions placed before the initial position.

Owing to these shifted positions, the driver's brake pedal feeling will be remarkably improved in the control mode.

Spring 64 is a spring of lesser total height. For instance, a Belleville spring with a corresponding characteristic curve can be used. The movement of the piston 61 to the left is possible because pump pressure is prevailing on its right-hand side, whilst solely the force of the spring 64 that is to be dimensioned correspondingly is acting from the left. Besides, no hydraulic pressure is prevailing on the left side of piston 61, since the supply chamber 13 is unpressurized, as is shown.

Figure 3:
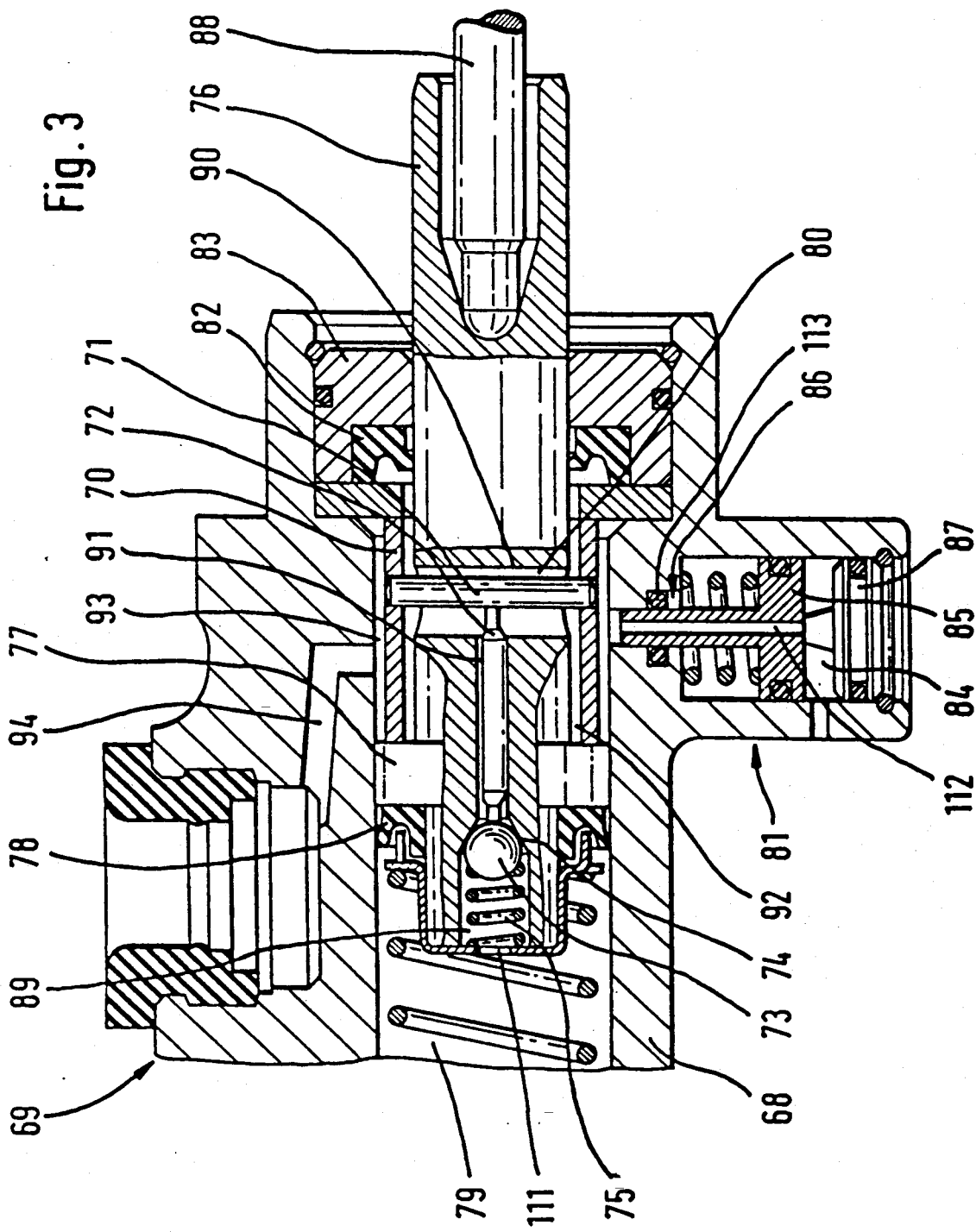
FIG. 3 displays a cross-sectional view of a second embodiment.

In FIG. 3, reference numeral 68 shows that part of a master cylinder housing which houses a mechanical blocking unit for the tappet 72 of the central regulating valve and a fixing mechanism for positioning this blocking unit.

Housed inside the master cylinder which, as a whole, is referred to by 69 is a sleeve 70. This sleeve has a cross pin 71. Said cross pin serves as a stop for the tappet 72 of the regulating valve. Thus, sleeve with cross pin block the tappet when it tends to move also to the right in consequence of a movement of the working piston to the right. The arrangement of sleeve 70 and cross pin 71 designed as blocking unit can be fixed in several positions left of its initial position by way of the piston 86 serving as fixing mechanism.

The regulating valve itself is composed of a ball 73 and a valve seat 74. This ball is applied by the pressure of spring 75. As can be taken from FIG. 3, the ball can be lifted by the tappet from the valve seat.

FIG. 3 illustrates a piston shaft 76 and a piston end. This piston end 77 comprises a seal 78 sealing the working chamber 79 of the master cylinder. A recess 80 is provided in the piston shaft 76. Cross pin 71 is located inside this recess. Piston end 77 serves as a stop for sleeve 70. When the brake is released, that means when the piston end returns into its right-hand initial position, the piston end will entrain sleeve 70 in the direction to the right.

The master cylinder has a housing attachment 81 that is of cylinder-shaped design as well as a closure member 83 furnished with a seal 82.

A hydraulic piston-cylinder assembly is accommodated in the cylindrically designed attachment 81. The cylinder is formed by the pressure chamber 84. The piston is designed as a converter piston 85. It converts the pump pressure prevailing in the chamber 84 during the control mode into a force which acts upon the end of the piston rod of the converter piston, the said end being designed as piston 86. 87 is a closure member for sealing the chamber 84. Piston 86 is furnished with the seal 113.

The mode of operation of the embodiment according to FIG. 3 will be described hereinbelow.

The pedal force boosted by the brake power booster acts upon the push rod 88 in the direction to the left. The push rod displaces the piston consisting of piston shaft and piston end to the left.

The position of the piston shaft and/or piston end is of decisive importance for the pedal's position.

In the normal braking mode, pressure develops in the working chamber when the piston end is displaced to the left. This pressure is also prevailing in the chamber 89 which is hydraulically connected with the working chamber through the opening 111. Caused by the rising pressure in chamber 79, the ball 73 is pressed onto the valve seat.

In another movement of the piston shaft to the left, the rear wall 90 of the recess 80 of the piston shaft comes into abutment on the cross pin. Caused thereby, cross pin and sleeve 70 are moved to the left into the master cylinder.

There is sufficient distance between cross pin 71 and tappet 72 of the central valve in the normal braking mode. Hence follows that the pressure development in the master cylinder can be performed corresponding to the pedal force.

After sleeve 70 has been moved a specific distance into the master cylinder caused by the rear wall 90 abutting on the cross pin 71 and thus by virtue of the piston shaft 76, it is now to be assumed for further description of the mode of function that an anti-lock control mode sets in.

The working chamber 79 is applied by pump pressure in the control mode. As a result, the working piston composed of piston end and piston shaft is moved to the right.

At the same time, sleeve 70 is blocked by piston 86, i.e. the sleeve is fixed in its instantaneous position slid into the cylinder.

Fixing of the sleeve in its inshifted position takes place as follows:

Under the effect of the hydraulic pressure in chamber 84, piston 86 is pressed radially against the sleeve and jams it in the master cylinder housing. Thus, the cross pin 71 assumes a predefined position which is in front of the initial position. That means the cross pin as stop for the tappet 72 is moved into the cylinder and is positioned there in the control mode.

As is illustrated, the working piston consisting of piston end and piston shaft moves to the right in the control mode. Tappet 72 moves against the cross pin 71 serving as stop. Tappet 72 disposed on the stop lifts the ball 73 from the valve seat 74. Pressure fluid can thus flow out of the working chamber 79, via the opening 111, through the chamber 89, between ball and valve seat, through the channel 91, the recess 80, the inner annular chamber 92 into the outer annular chamber 93. Inner and outer annular chambers are interconnected hydraulically. Pressure fluid flows from the outer annular chamber through the channel 94 to the unpressurized supply reservoir, see FIG. 1.

A control action takes place between ball and valve seat. Herein, the working piston remains in a position shifted into the master cylinder.

As is known, working piston and brake pedal are interconnected by the braking pressure booster and/or the pedal assembly. Hence follows that neither the brake pedal is returned into its end position.

Pressure-relief of the working chamber 79 takes place as follows during the control mode:

The SO-valves and SG-valves of the pressure modulator are actuated corresponding to the control algorithm installed in the electronic control unit. As a result, pressure fluid flows via the pressure modulator back into the supply reservoir.

Pressure fluid flows via the line 94 into the supply reservoir through the regulating central valve disposed in the working piston of the master cylinder.

A certain quantity of fluid discharges in the control mode through the throttle bore 112 in the locking piston 86.

When the control mode is terminated, the pressure chamber 79 will exhaust as follows:

Pressure fluid discharges through the throttle bore 112. Besides, pressure fluid flows through the channel 94 into the supply reservoir.

Figure 4:
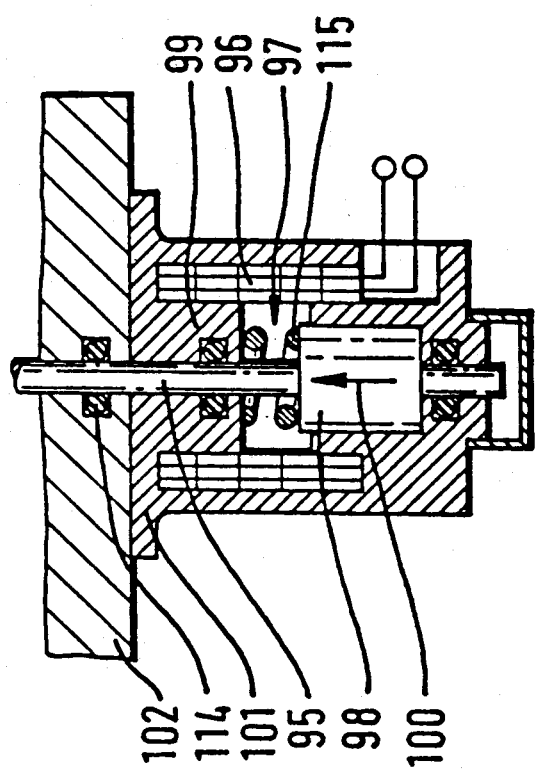

A solenoid is illustrated in FIG. 4 which urges the piston 95 against the sleeve 70, the said piston serving as a fixing mechanism and being provided with the seal 114. This solenoid can be controlled by the electronic control unit of the braking pressure regulating device. The solenoid is secured with its housing 101 to the master cylinder housing 102.

When the coil 96 is excited due to a signal of the control unit, the end surfaces of the armature 98 and of the pole core 99 oppositely disposed in the air gap 97 will be polarized. The resultant attractive force moves the armature in the direction of the arrow 100. Transmitted onto the piston 95 is the contact force for fixing of the sleeve. The resetting of the fixing mechanism, that means of the piston 95 of FIG. 4, is effected by a current-off-signal of the electronic control unit. This eliminates the excitation of the magnet coil, and the spring 115 resets the piston 95.

FIG. 5 shows a master cylinder housing attachment 103 which disposes of a cylinder. This cylinder houses a vacuum chamber 104 as well as a chamber with atmospheric pressure 105. Both chambers are isolated by a converter piston 106. When vacuum is generated in the chamber 104 by the vacuum line 107, the piston 105 furnished with seal 116 and throttle bore 18 moves in the direction of the arrow 108. The sleeve will be fixed, as is shown in respect with FIG. 3.

110 represents a pneumatic valve which governs the vacuum in chamber 104. This pneumatic valve, in turn, is operated by the electronic control unit of the braking pressure regulating device. Resetting of the piston 105 takes place by ventilation via the line 7 at port 17.

Likewise in the embodiment according to FIG. 5, a throttle bore 18 can be made use of analogously to the embodiment according to FIG. 3.

Several embodiments of the instant invention have been described hereinabove. This invention is not limited to these embodiments. It is also possible to choose other designs and arrangements for the sleeve with cross member serving as blocking unit. Further embodiments of the fixing mechanism for the sleeve are permitted within the scope of this invention, too. Thus, a variation of the embodiments according to FIGS. 3, 4, 5 can be chosen, wherein further depression of the brake pedal and/or further release is possible. A reduction in overall length is achieved in that the fixing mechanism grips behind the sleeve. The blocking unit may likewise be composed of several elements instead of consisting of one element, as it is displayed.

What is claimed is:

1. A braking pressure regulating anti-lock control and traction slip control device for hydraulic brake systems of automotive vehicles, comprising in combination: a master cylinder with at least one working piston, and at least one working chamber, a supply reservoir for pressure fluid, a pressure modulator for the variation of the hydraulic pressure in the wheel cylinders of the wheel brakes during the braking pressure control mode, said pressure modulator including inlet and outlet valves for the wheel cylinders, an electronic control unit for the control of the valves of the modulator, at least one motor-driven pump for generating a hydraulic pressure, the working chamber of the master cylinder being applied by pump pressure in the braking pressure control mode and the working piston of the master cylinder being movable in the direction of its initial position caused by the pump pressure, a regulating valve being provided in at least one working piston which, in the braking pressure control mode, regulates the pressure fluid flow in the hydraulic fluid cycle composed of the at least one pump, the at least one working chamber of the master cylinder and the supply reservoir, including means for displacing the switching positions of the regulating valve incorporated in the working piston into the master cylinder in the braking pressure control mode.

2. A braking pressure regulating device as claimed in claim 1, wherein the regulating valve is composed of a valve seat, a valve closure member, a tappet acting upon the valve member and opening the regulating valve, and a stop for the tappet, wherein in the braking pressure control mode, the stop for the tappet is arranged to move by predefined distances away from its initial position into the master cylinder so that in the braking pressure control mode the pressure fluid flow control in the hydraulic fluid cycle takes place at positions of the working piston which are displaced into the master cylinder.

3. A braking pressure regulating device as claimed in claim 2, wherein hydraulic actuating means comprising a hydraulic piston-cylinder assembly applicable by the pump pressure is provided which positions the stop for the tappet in the direction into the master cylinder at a predetermined distance in front of its initial position.

4. A braking pressure regulating device as claimed in claim 2, wherein the stop for the tappet comprises a stop device which includes a movable direct stop member (56) and a movable indirect stop member (61).

5. A braking pressure regulating device as claimed in claim 4, wherein the movable stop member (61) is arranged to be positioned by the pump pressure and by the force of a spring element (64).

6. A braking pressure regulating device as claimed in claim 4, wherein a separate pressure chamber (59) is provided in the master cylinder which is confined by the movable stop member (61) and is of a variable volume.

7. A braking pressure regulating device as claimed in claim 4 wherein the movable stop member (61) is provided as a piston which is arranged displaceable by the pump pressure in opposition to the force of a spring (64).

8. A braking pressure regulating device as claimed in claim 1 which comprises a vacuum brake power booster, wherein a separate pressure chamber (59) is provided in the master cylinder (16) which is defined by the master cylinder housing, a displaceable piston (61) and the force-transmitting element (62) of the brake power booster (9).

9. A braking pressure regulating device as claimed in claim 1, wherein a mechanical blocking unit is provided which is fixed in at least one positions by a fixing mechanism and comprises a sleeve (70) accommodated in the master cylinder and having a stop element for the tappet of the regulating valve (72), said stop element comprises a component part (71) which is placed crossly to the axis of the master cylinder (79) and is arranged as a pin, and which is located within said sleeve (70).

10. A braking pressure regulating device as claimed in claim 1, wherein a fixing mechanism (86) is arranged in the master cylinder housing displaceable radially in opposition to the sleeve (70), which fixes the sleeve (70) in at least one position by operative jamming engagement.

11. A braking pressure regulating device as claimed in claim 1 wherein a fixing mechanism (86) is arranged in the master cylinder housing displaceable radially in opposition to a sleeve (70), which fixes the sleeve (70) in at least one one position by positive engagement by catching sleeve (70) thereby to fix the position of said sleeve (70).

12. A braking pressure regulating device as claimed in claim 9, wherein the fixing mechanism is arranged as a piston (86) which is guided in the master cylinder wall and is slidable by a hydraulic piston-cylinder assembly (85, 84), with the piston-cylinder assembly being acted upon by the pressure fluid of the pump in the braking pressure control mode.

13. A braking pressure regulating device as claimed in claim 9 wherein the fixing mechanism is designed as a piston (95) which is guided in the master cylinder wall (102) and is displaceable arranged by an electromagnetic lifting mechanism including a magnet (96, 100, 101), with said lifting mechanism being controlled by the electronic control unit of the braking pressure regulating device.

14. A braking pressure regulating device as claimed in claim 9, wherein the fixing mechanism is arranged as a piston (109) which is guided in the master cylinder wall (102) and which is displaceable by the force of a pneumatic converter (104, 106) which converts the difference between the atmospheric pressure and the pressure below atmospheric pressure in one of the suction pipe of the internal combustion engine of the automotive vehicle or a vacuum pump into a translatory force and transmits it onto the piston (109), said pneumatic converter being controlled by the electronic control unit of the braking pressure regulating device.

* * * * *